United States Patent [19]

Lee et al.

[11] Patent Number: 4,969,327

[45] Date of Patent: Nov. 13, 1990

[54] HYPERSONIC SCRAMJET ENGINE FUEL INJECTOR

[75] Inventors: Ching-Pang Lee, Cincinnati; Kattalaicheri S. Venkataramani, Westchester; Daniel J. Lahti, Cincinnati, all of Ohio; Vincent H. Lee, Jupiter, Fla.

[73] Assignee: General Electric Company, Cincinnati, Ohio

[21] Appl. No.: 422,178

[22] Filed: Oct. 16, 1989

Related U.S. Application Data

[62] Division of Ser. No. 245,181, Sep. 16, 1988, Pat. No. 4,903,480.

[51] Int. Cl.⁵ .............................. F02K 7/10
[52] U.S. Cl. ........................ 60/270.1; 60/742
[58] Field of Search ............... 60/270.1, 739, 740, 60/742

[56] References Cited

U.S. PATENT DOCUMENTS

| | | | |
|---|---|---|---|
| 2,844,938 | 7/1958 | Longwell | 60/740 |
| 3,143,401 | 8/1964 | Lambrecht | |
| 3,355,891 | 12/1967 | Rhodes | 60/270.1 |
| 3,430,446 | 3/1969 | McCloy | 60/270.1 |
| 3,581,495 | 6/1971 | Kah, Jr. | 60/742 |
| 3,699,773 | 10/1972 | Schuning et al. | 60/743 |
| 4,514,144 | 4/1985 | Lee | 416/96 R |
| 4,627,480 | 12/1986 | Lee | 164/369 |
| 4,802,639 | 2/1989 | Hardy et al. | 244/160 |
| 4,821,512 | 4/1989 | Guile et al. | 60/270.1 |

*Primary Examiner*—Donald E. Stout
*Attorney, Agent, or Firm*—Douglas E. Erickson; Jerome C. Squillaro

[57] ABSTRACT

A hypersonic scramjet engine fuel injector and a hypersonic scramjet engine having such a fuel injector. The engine has a serially connected inlet, combustor, and exhaust nozzle. Multiple, horizontally-spaced-apart fuel injectors are positioned in and connected to the combustor's top portion. Each fuel injector has a hollow wedge shape housing. To improve fuel-air mixing for better combustion, the housing's end wall has multiple, discrete, convergent-divergent fuel outlet nozzles and its side walls have horizontally-extending exterior grooves. Fuel is used to cool the fuel injector housing with the housing's bottom and side walls having fuel-exit holes and the housing having an interior serpentine fuel passageway.

6 Claims, 3 Drawing Sheets

HYPERSONIC SCRAMJET ENGINE FUEL INJECTOR

The U.S. Government has rights in this invention pursuant to Contract No. F33657-86-C-2136 between the U.S. Air Force and the General Electric Company.

This is a division, of application Ser. No. 245,181, filed Sept. 16, 1988, and now U.S. Pat. No. 4,903,480.

BACKGROUND OF THE INVENTION

The present invention relates generally to scramjet engines and more particularly to a fuel injector for a hypersonic flight vehicle scramjet engine.

At hypersonic Mach numbers (i.e., greater than Mach 5) a flight vehicle having an air breathing engine, such as a scramjet, requires an engine combustion chamber (also known as a combustor) having a large frontal cross-sectional area. In scramjet engine design, it is important to distribute the fuel, such as pressurized hydrogen gas, uniformly over this area for proper combustion. It is noted that injecting the fuel into the combustor itself provides thrust apart from the thrust created by the fuel combustion. In commonly assigned and copending U.S. patent application Ser. No. 828,844 entitled "Ramjet/Scramjet Engine" by DANIEL J. Lahti et al., filed Jan. 2, 1986, there is shown a scramjet engine having an array of horizontally-spaced fuel injectors each with a wedge shape wherein the fuel exits a single convergent-divergent fuel outlet nozzle (a single-wall-slot fuel injector) into the combustor. Combustor design is always concerned with proper mixing of the fuel and the inlet air for uniform combustion. As the engine inlet compresses (and therefor heats) the incoming air and as the incoming air impinges upon the fuel injector at hypersonic speeds (and therefor frictionally heats the fuel injector), there also is the problem of cooling the fuel injector so as to prolong component life and/or allow the use of materials that would fail without cooling.

SUMMARY OF THE INVENTION

It is an object of the invention to provide a hypersonic scramjet engine fuel injector which promotes mixing of the fuel with the engine inlet air.

It is another object of the invention to provide a hypersonic scramjet engine fuel injector which is cooled for protection against the hypersonic-speed impingement of the compressed inlet air.

It is an additional object of the invention to provide a hypersonic scramjet engine for such a fuel injector.

In the first through the fourth embodiments of the invention claimed as a fuel injector, the hypersonic scramjet engine fuel injector commonly includes a right-triangular-wedge-shaped, fuel-tight housing having a right-triangular cross section defined by the following attached walls: a horizontal top wall with a fuel inlet orifice, an inclined bottom wall, and a vertical end wall. Two right-triangular-shaped vertical side walls are attached to the previously-mentioned walls to complete the housing.

In the first embodiment, the fuel injector's end wall also has at least two discrete, vertically-spaced-apart convergent-divergent fuel outlet nozzles.

In the second embodiment, the fuel injector's end wall has a convergent-divergent fuel outlet nozzle, and the side walls have at least two vertically-spaced apart, horizontally-extending exterior grooves which deepen towards, and reach, the end wall.

In the third embodiment, the fuel injector's end wall has a convergent-divergent fuel outlet nozzle, and at least one of the bottom and side walls has at least two spaced-apart fuel-exit holes.

In the fourth embodiment, the fuel injector's end wall has a convergent-divergent fuel outlet nozzle, and its fuel inlet orifice is distal its end wall. The fuel injector also includes at least two spaced-apart interior walls inside the housing connected to the side walls to create a fuel passageway having a serpentine-shaped cross section with a straight segment from the inlet orifice along a majority of the bottom wall.

In the fifth through the eighth embodiments of the invention claimed as an engine, the hypersonic scramjet engine commonly includes an inlet, a combustor serially connected to the inlet's aft portion, an exhaust nozzle serially connected to the combustor, and at least two horizontally-spaced-apart fuel injectors positioned in the combustor and connected to the combustor's top portion. Each fuel injector's bottom wall is coplanar and coextensive with the inlet's inclined upper wall.

The fifth embodiment engine employs first embodiment fuel injectors, the sixth embodiment engine employs second embodiment fuel injectors, the seventh embodiment engine employs third embodiment fuel injectors, and the eighth embodiment engine employs fourth embodiment fuel injectors.

Several benefits and advantages are derived from the invention. The multiple fuel outlet nozzle and the sidewall groove features of the invention each promote better mixing of the fuel with the air for improved combustion. The side/bottom wall fuel-exit hole and serpentine internal fuel passageway features of the invention each provide cooling by the fuel of the fuel injector's bottom and side walls in a thermally-harsh hypersonic environment.

BRIEF DESCRIPTION OF THE DRAWINGS

The accompanying drawings illustrate several embodiments of the present invention wherein.

DETAILED DESCRIPTION OF THE INVENTION

Figure 1:
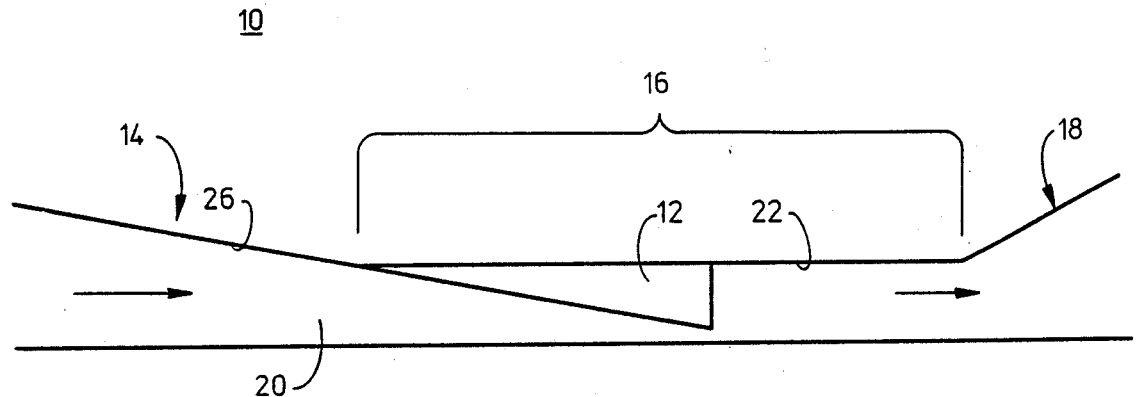
FIG. 1 is schematic diagram of the invention showing the hypersonic scramjet engine including its fuel injector.
Figure 2:
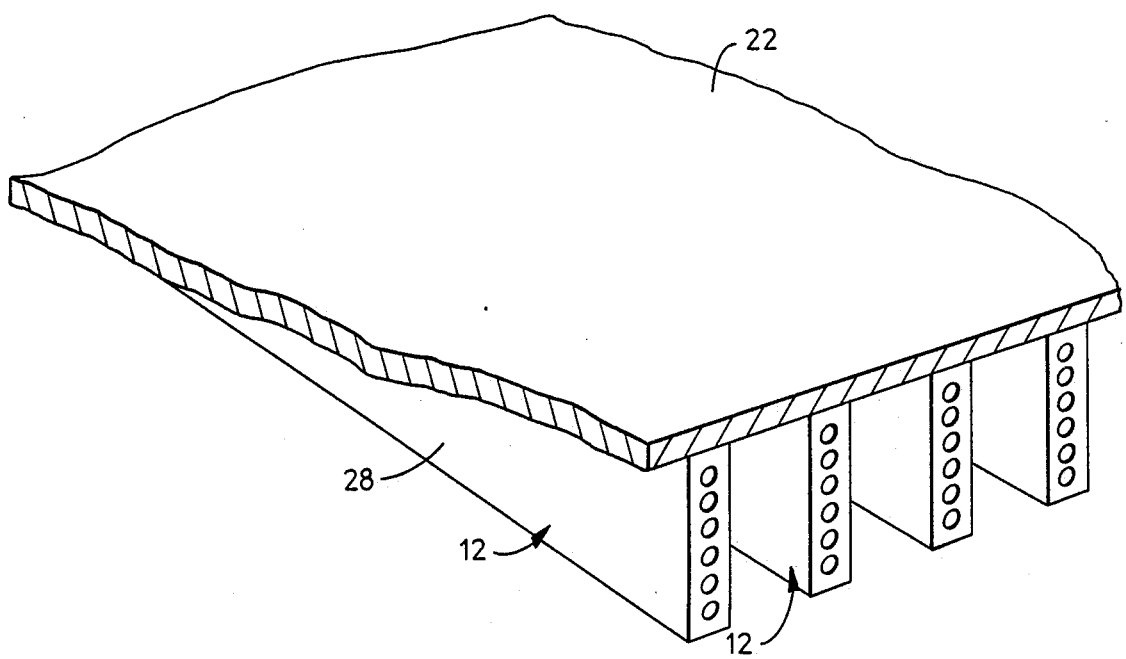
FIG. 2 is a perspective partial view of the engine of FIG. 1 showing an array of fuel injectors connected to the top portion of the engine's combustor.

The present invention, as embodied in a hypersonic scramjet engine 10 and a fuel injector 12, is illustrated generally in FIGS. 1 and 2, with particular alternate designs of the fuel injector 12 shown in FIGS. 3-5, 6-7, and 8-9. The hypersonic scramjet engine 10 includes an inlet 14, a combustor 16, an exhaust nozzle 18, and a plurality of horizontally-spaced-apart fuel injectors 12, as shown in FIGS. 1 and 2. Ignitors (not shown) could be added in the combustor if the fuel were not self-igniting, as is known to those skilled in the art. The combustor 16 is serially connected to the aft portion 20 of the inlet 14, while the exhaust nozzle 18 is serially connected to the combustor 16. The fuel injectors 12 are disposed in the combustor 16 and are connected to the top portion 22 of the combustor 16. The inclined bottom wall 24 of each fuel injector 12 is generally coplanar and coextensive with the inclined upper wall 26 of the inlet 14.

In a first embodiment of the invention, best seen in FIGS. 2-5, each hypersonic scramjet engine fuel injector 12 includes a housing 28 having a generally horizontal top wall 30, the previously mentioned inclined bottom wall 24, and a generally vertical end wall 32 which are attached together to define in cross section a generally right triangle. This right-triangle shape is the shape of two vertical side walls 34 which also make up the housing 28. The side walls 34 are attached to the top 30, bottom 24, and end 32 walls to define a fuel-tight, generally right-triangular hollow wedge which is the fuel injector housing 28. The top wall 30 of the fuel injector housing 28 has a fuel inlet orifice 36, and the end wall 32 has a plurality of discrete, vertically-spaced-apart convergent-divergent fuel outlet nozzles 38. Each supersonic fuel outlet nozzle 38 can be either circular or elliptical.

Additional thrust is provided by the fuel, apart from combustion, as the fuel issues through the multiple fuel outlet nozzles 38 at supersonic velocities in a direction generally parallel to the engine airflow. The discrete fuel outlet nozzles 38 distribute the fuel without obstructing the flowpath. The base areas 40 around each fuel outlet nozzle 38 provide recirculation zones which act as sources of free radicals and heat to ignite the fuel-air mixture. Thus, the base areas 40 act as flame holders without the use of steps in the flowpath. These features improve the efficiency of the combustion process and thrust production. The discrete fuel outlet nozzles 38 provide better fuel distribution than does a single-wall-slot fuel injector.

Figure 9:
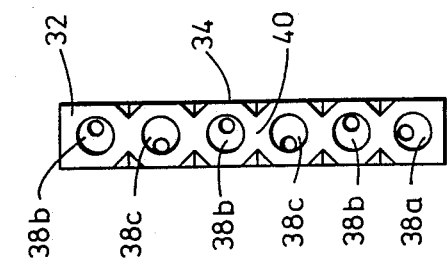
FIG. 9 is a back-elevational view of the fuel injector of FIG. 8.

In a preferred configuration, as seen in FIG. 9, the fuel outlet nozzle 38a closest the bottom wall 24 is canted, with respect to the end wall 32, toward the bottom wall 24. Also, one fuel outlet nozzle 38b is canted, with respect to the end wall 32, generally-horizontally toward one of the side walls 34 while an adjacent fuel outlet nozzle 38c is canted, with respect to the end wall 32, generally-horizontally toward the other of the side walls 34. The canted fuel outlet nozzles 38a, 38b, and 38c remain generally parallel to the engine airflow, the degree of tilt being small but sufficient to increase the mixing of the fuel, exiting the fuel outlet nozzles 38, with the air to improve combustion.

Figures 3, 4, 5, 6, 7:
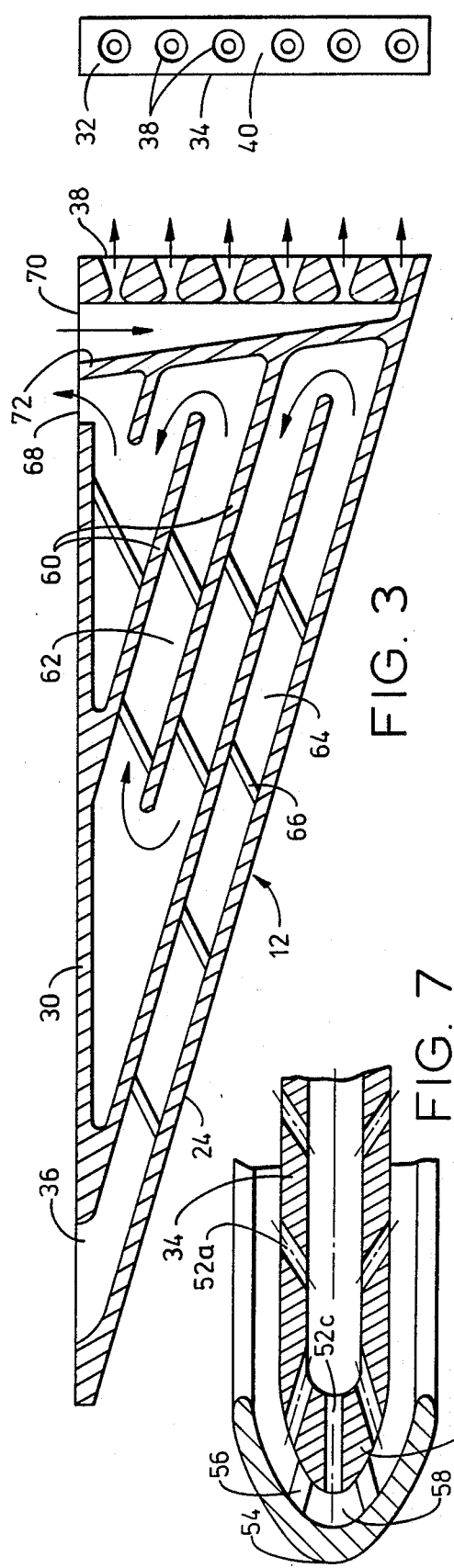
FIG. 3 is a side-elevational cross-sectional view of one design of one of the fuel injectors of FIG. 2.
FIG. 4 is a top plan view of the fuel injector of FIG. 3.
FIG. 5 is a back-elevational view of the fuel injector of FIG. 3.
FIG. 6 is a side-elevational cross-sectional view of an alternate design of one of the fuel injectors of FIG. 2.
FIG. 7 is a cross-sectional view taken along lines 7—7 of FIG. 6.

In an exemplary configuration, as seen in FIG. 6, the fuel injector 12 also includes a plurality of spaced-apart, generally parallel, and generally-horizontally-oriented interior walls 42. These horizontal interior walls 42 are disposed within the fuel injector housing 28 and are connected to the side walls 34 to define fuel guideways 44. They also are spaced from the bottom wall 24 and extend to the end wall 32 of the housing 28. The horizontal interior walls 42 act to channel the fuel towards the fuel outlet nozzles 38 in a direction parallel to the engine airflow.

Figure 8:
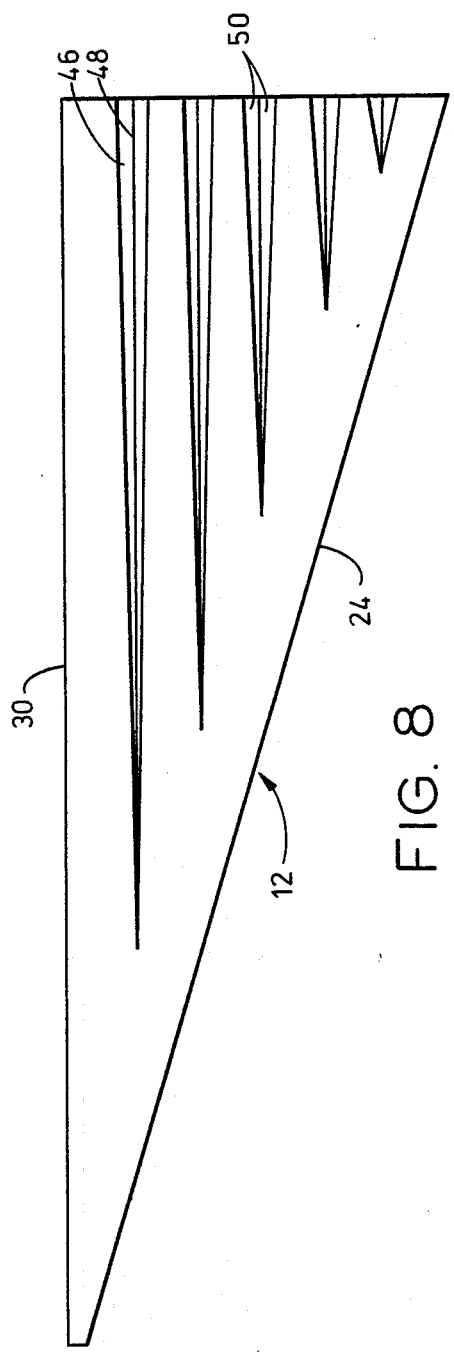
FIG. 8 is a side-elevational view of another alternate design of one of the fuel injectors of FIG. 2.

In a second embodiment of the invention, as seen in FIGS. 8 and 9 together with FIGS. 2-5, each hypersonic scramjet engine fuel injector 12 includes the elements of the first embodiment previously discussed, with the exception that the second embodiment may have an end wall 32 with a single convergent-divergent fuel outlet nozzle (a single-wall-slot fuel injector) or it may have a plurality of discrete, vertically-spaced-apart convergent-divergent fuel outlet nozzles 38. In the second embodiment, the fuel injector side walls 34 have a plurality of vertically-spaced-apart, generally-horizontally-extending exterior grooves 46 which deepen towards and reach the end wall 32. The exterior grooves 46 receive a volume of the compressed inlet air moving past the fuel injector housing 28, such volume thereby having imparted to it a transverse velocity component which better mixes such air with the fuel from the end wall fuel outlet nozzles 38 for improved combustion. Fuel-air mixing also is enhanced due to the vortices produced by the scarf edges. In a preferred configuration, the exterior grooves 46 also widen toward the end wall 32 for better air-fuel mixing. In an exemplary configuration which facilitates manufacture, each exterior groove 46 has a generally-horizontally-extending centerline 48 and two mirror image planar groove surfaces 50 connected to the centerline 48 with each groove surface 50 having the shape of a general right triangle.

In a third embodiment of the invention, as seen in FIGS. 6 and 7 together with FIGS. 2-5, each hypersonic scramjet engine fuel injector 12 includes the elements of the first embodiment previously discussed, with the exception that the third embodiment (like the second embodiment) may have an end wall 32 with a single convergent-divergent fuel outlet nozzle (a single-wall-slot fuel injector) or it may have a plurality of discrete, vertically-spaced-apart convergent-divergent fuel outlet nozzles 38. In the third embodiment, at least one wall of the bottom 24 and side 34 walls of the fuel injector 12 has a plurality of spaced-apart fuel-exit holes 52. Preferably, the fuel-exit holes 52 are located in the bottom wall 24, or in each side wall 34, or in each of the bottom and side walls. The fuel also acts as the coolant. The exterior surfaces of the bottom 24 and/or side 34 walls are cooled by the fuel from the fuel-exit holes 52 which provides external film cooling resulting in better thermal protection for the fuel injector housing 28. Another advantage of the fuel-exit holes 52 is the reduction of air friction on the external surfaces due to the cooling film. In addition, the cooling film provides a means for fueling part of the air flow between the fuel injectors 12 in the scramjet engine 10, thus increasing mixing of fuel and air.

In the fuel injector configuration having fuel-exit holes 52a in a side wall 34, as seen in FIGS. 6 and 7, the holes 52a preferably are canted, with respect to the side wall 34, toward the end wall 32. Canting the side-wall fuel-exit holes 52a towards the end wall 32 results in a portion of the exiting fuel being recovered as engine thrust apart from combustion.

In the fuel injector configuration having fuel-exit holes 52b in the bottom wall 24, as seen in FIG. 6, the holes 52b preferably are generally perpendicular to the bottom wall 24. Such bottom-wall fuel-exit holes 52b facilitate manufacture.

In an alternate configuration, the fuel injector 12 also includes a deflector 54 connected to the housing's bottom wall 24 by multiple tab members 56 so as to leave a space 58 between the deflector 54 and bottom wall 24. The deflector 54 is positioned near the bottom-wall fuel-exit holes 52c and is large enough to at least span the holes 52c. In an exemplary configuration, the deflector 54 is also attached to the front of the bottom wall 24 (see FIG. 6) and transversely spans the side walls 34 (see FIG. 7) to provide a shield from the inlet air for the cooling film of fuel exiting the fuel exit holes 52 in the bottom 24 and side 34 walls. Without the shield the cooling film would be dispersed more quickly by the inlet air. With the deflector 54 present, all the perpendicular fuel-exit holes 52b shown in FIG. 6 are preferably replaced with fuel-exit holes 52c which are generally horizontal and therefor generally parallel to the top wall 30. The horizontal holes 52c provide better impingement cooling of the fuel on the deflector 54. Without a deflector 54 present, the perpendicular fuel-exit holes 52b of FIG. 6 are preferably substituted for the horizontal fuel-exit holes 52c.

In a fourth embodiment of the invention, as seen in FIGS. 2-5, each hypersonic scramjet engine fuel injector 12 includes the elements of the first embodiment previously discussed, with the exception that the fourth embodiment (like the second and third embodiments) may have an end wall 32 with a single convergent-divergent fuel outlet nozzle (a single-wall-slot fuel injector) or it may have a plurality of discrete, vertically-spaced-apart convergent-divergent fuel outlet nozzles 38. In the fourth embodiment, as seen in FIG. 3, the fuel injector 12 also includes a plurality of spaced-apart, generally parallel, inclined interior walls 60 which are also generally parallel to the bottom wall 24. These inclined interior walls 60 are disposed within the fuel injector housing 28 and are connected to the side walls 34 to define a fuel passageway 62 which has a serpentine-shaped cross section with a generally straight segment 64 from the injector top wall fuel inlet orifice 36, which is distal the end wall 32, along a majority portion of the injector bottom wall 24. Thus the serpentine fuel passageway 62 directs the fuel to first cool the interior surface of the bottom wall 24 upon whose aerodynamically-heated exterior surface the inlet airflow impinges.

In a preferred configuration, as seen in FIG. 3, the fuel injector 12 also includes a multiplicity of angled, turbulence-promoting ribs 66 positioned within the fuel passageway 62 and connected to at least one wall of the bottom 24 and inclined interior 60 walls. Preferably, the ribs 66 are connected to the bottom wall 24, or to each inclined interior wall 60, or to each of the bottom and inclined interior walls. The ribs 66 produce the vortex shedding and the swirl flow to enhance the cooling effectiveness.

In an exemplary configuration, as seen in FIGS. 3 and 4, the fuel injector top wall 30 has a fuel outlet orifice 68 near the end wall 32 and in communication with the fuel passageway 62, and the top wall 30 also has a fuel inlet opening 70 positioned between the fuel outlet orifice 68 and the end wall 32. Also, a fuel-passageway-bounding interior back wall 72 angles towards the end wall 32 extending from the top wall 30, between the fuel outlet orifice 68 and the fuel inlet opening 70, to the bottom wall 24.

Obviously, the previously-discussed first four embodiments of the invention can exist in various combinations in the same fuel injector, as can be appreciated by those skilled in the art.

In a preferred configuration, the hollow, thin-wall, light-weight fuel injector housing 28 is cast as an integral piece to be cost effective and to eliminate leakage. Current casting technology allows even the turbulence-promoting ribs 66 to be part of the integral housing 28, as can be appreciated by the artisan from a reading of U.S. Pat. Nos. 4,514,144 and 4,627,480 (each entitled "Angled Turbulence Promoter", each by Ching-Pang Lee, and each respectively issued Apr. 30, 1985 and Dec. 9, 1986). The previously-discussed deflector 54 and tab members 56 may be discrete parts with attachment to the fuel injector housing 28 accomplished by welding. The fuel, fuel tank, any fuel pressurization system, and the fuel conduits leading to the fuel injector housing's inlet orifice 36 do not form a part of the previously-discussed first four or any other embodiments of this invention, but are known to those skilled in the art to use with this invention.

In a fifth through eighth embodiment of the invention, the previously-described scramjet engine 10 employs a respective one of the fuel injectors 12 of the previously-described first through fourth embodiments of the invention.

The foregoing description of several preferred embodiments of the invention has been presented for purposes of illustration. It is not intended to be exhaustive or to limit the invention in the precise form disclosed, and obviously many modifications and variations are possible in light of the above teaching. It is noted that the terms "upper" and "lower", "horizontal" and "vertical", and the like, are terms of convenience used to describe the elements of the scramjet engine 10 and fuel injector 12. For example, it is clear that the fuel injector 12 can be oriented, with respect to the rest of the hypersonic scramjet engine 10, at any pre-chosen angle about the engine's longitudinal axis and that the scramjet engine 10 can be oriented, with respect to the rest of a hypersonic flight vehicle (not shown) at any pre-selected angle about the vehicle's longitudinal axis. In preferred embodiments of the invention, the previously-listed terms describe the elements of the fuel injector 12 and scramjet engine 10 when its associated hypersonic flight vehicle is in level flight. It is intended that the scope of the invention be defined by the claims appended hereto.

We claim:

1. A hypersonic scramjet engine fuel injector comprising a housing having a generally horizontal top wall, an inclined bottom wall, and a generally vertical end wall attached together to define in cross section a generally right triangle, said housing also having two generally vertical side walls having a said-generally-right-triangle shape, said side walls attached to said top, bottom, and end walls to define a fuel-tight, generally right-triangular wedge, said top wall having a fuel inlet orifice and said end wall having a plurality of discrete, vertically-spaced-apart convergent-divergent fuel outlet nozzles.

2. The fuel injector of claim 1, wherein at least one of said fuel outlet nozzles is canted with respect to said end wall.

3. The fuel injector of claim 2, wherein at least one of said fuel outlet nozzles is canted, with respect to said end wall, generally-horizontally toward one of said side walls, and an adjacent one of said fuel outlet nozzles is canted, with respect to said end wall, generally-horizontally toward the other of said side walls.

4. The fuel injector of claim 3, wherein one of said fuel outlet nozzles closest said bottom wall is canted, with respect to said end wall, toward said bottom wall.

5. A hypersonic scramjet engine fuel injector comprising a housing having a generally horizontal top wall, an inclined bottom wall, and a generally vertical end wall attached together to define in cross section a generally right triangle, said housing also having two generally vertical side walls having a said-generally-right-triangle shape, said side walls attached to said top, bottom, and end walls to define a fuel-tight, generally right-triangular wedge, said top wall having a fuel inlet orifice and said end wall having a plurality of discrete, vertically-spaced-apart convergent-divergent fuel outlet nozzles, and said fuel injector also including a plurality of spaced-apart, generally parallel, and generally-horizontally-oriented interior walls disposed within said housing and connected to said side walls to define fuel guideways, said interior walls spaced from said bottom wall and extending to said end wall.

6. A hypersonic scramjet engine comprising:

(a) an inlet having an inclined upper wall and having an aft portion;
(b) a combustor serially connected to said aft portion of said inlet, said combustor having a top portion;
(c) an exhaust nozzle serially connected to said combustor; and
(d) a plurality of horizontally-spaced-apart fuel injectors disposed in, and connected to said top portion of, said combustor, each said fuel injector including a housing having a generally horizontal top wall, an inclined bottom wall, and a generally vertical end wall attached together to define in cross section a generally right triangle, said housing also having two generally vertical side walls having a said-generally-right-triangle shape, said side walls attached to said top, bottom, and end walls to define a fuel-tight, generally right-triangular wedge, said top wall having a fuel inlet orifice and said end wall having a plurality of discrete, vertically-spaced-apart convergent-divergent fuel outlet nozzles, wherein said bottom wall of each said fuel injector is generally coplanar and coextensive said upper wall of said inlet.

* * * * *